United States Patent
Didier

(10) Patent No.: US 11,858,317 B2
(45) Date of Patent: Jan. 2, 2024

(54) VEHICLE WINDOW VENT FOR PROTECTING PASSENGERS FROM EXCESS HEAT

(71) Applicant: Terrawagen, LLC, Portland, OR (US)

(72) Inventor: Eric A. Didier, Portland, OR (US)

(73) Assignee: TERRAWAGEN, LLC, Portland, OR (US)

(*) Notice: Subject to any disclaimer, the term of this patent is extended or adjusted under 35 U.S.C. 154(b) by 0 days.

(21) Appl. No.: 17/486,650

(22) Filed: Sep. 27, 2021

(65) Prior Publication Data
US 2023/0108096 A1    Apr. 6, 2023

(51) Int. Cl.
B60J 3/00    (2006.01)
B60J 1/20    (2006.01)

(52) U.S. Cl.
CPC .................................. B60J 1/2011 (2013.01)

(58) Field of Classification Search
CPC .......... B60J 1/2011; B60J 1/20; B60J 1/2002; B60H 1/267
USPC ........ 454/128, 131, 132, 133, 150; 296/152, 296/154
See application file for complete search history.

(56) References Cited

U.S. PATENT DOCUMENTS

| | | | |
|---|---|---|---|
| 1,588,653 A | 6/1926 | Brownlee | |
| 1,660,893 A * | 2/1928 | Smith | B60H 1/267 454/133 |
| 1,785,891 A * | 12/1930 | Danat | B60H 1/267 454/131 |
| 1,967,504 A * | 7/1934 | Gaughran, Jr. | B61D 25/00 454/133 |
| 2,628,549 A * | 2/1953 | Stelmach | F24F 13/12 160/369 |
| 2,949,842 A * | 8/1960 | Crandall | B60H 1/267 D23/388 |
| 3,292,521 A * | 12/1966 | Requa | B60H 1/267 454/133 |
| 3,434,408 A * | 3/1969 | Rivers | B60H 1/267 454/132 |
| 4,899,645 A * | 2/1990 | Wolfe | B60H 1/00428 454/200 |

(Continued)

FOREIGN PATENT DOCUMENTS

| | | | | |
|---|---|---|---|---|
| DE | 19533596 A1 | * | 3/1997 | ............. B60H 1/267 |
| GB | 2317006 A | * | 3/1998 | ............. B60H 1/267 |

*Primary Examiner* — Dennis H Pedder
(74) *Attorney, Agent, or Firm* — WORKMAN NYDEGGER

(57) ABSTRACT

A vehicle window vent is shaped and sized to fit in the opening left when the vehicle window is lowered or retracted. The vent fits in the opening, and its edges are captured by channels that hold the window when the window is closed. Along one edge, the vent comprises a channel, similar to the window-opening channel, so that the vent can accept an edge of the window. Thus, when the window is opened and then partially closed on the vent, the window and vent together are held securely in the window opening. The vent comprises louvered openings to allow air in and out of the vehicle. The openings may be covered with screen or mesh to prevent insects from entering the vehicle. Other features may be provided as well. An efficient method for manufacturing the vents is also described and claimed.

16 Claims, 10 Drawing Sheets

(56) References Cited

U.S. PATENT DOCUMENTS

| | | | | |
|---|---|---|---|---|
| 5,683,293 A | * | 11/1997 | Mohammed | B60J 1/20 |
| | | | | 296/97.11 |
| 6,042,473 A | * | 3/2000 | McClary | B60H 1/267 |
| | | | | 454/131 |
| 2003/0157878 A1 | * | 8/2003 | Shtanko | B60H 3/0085 |
| | | | | 454/131 |
| 2016/0185190 A1 | | 6/2016 | Thomas et al. | |
| 2019/0255927 A1 | * | 8/2019 | Georges | B60J 11/04 |

* cited by examiner

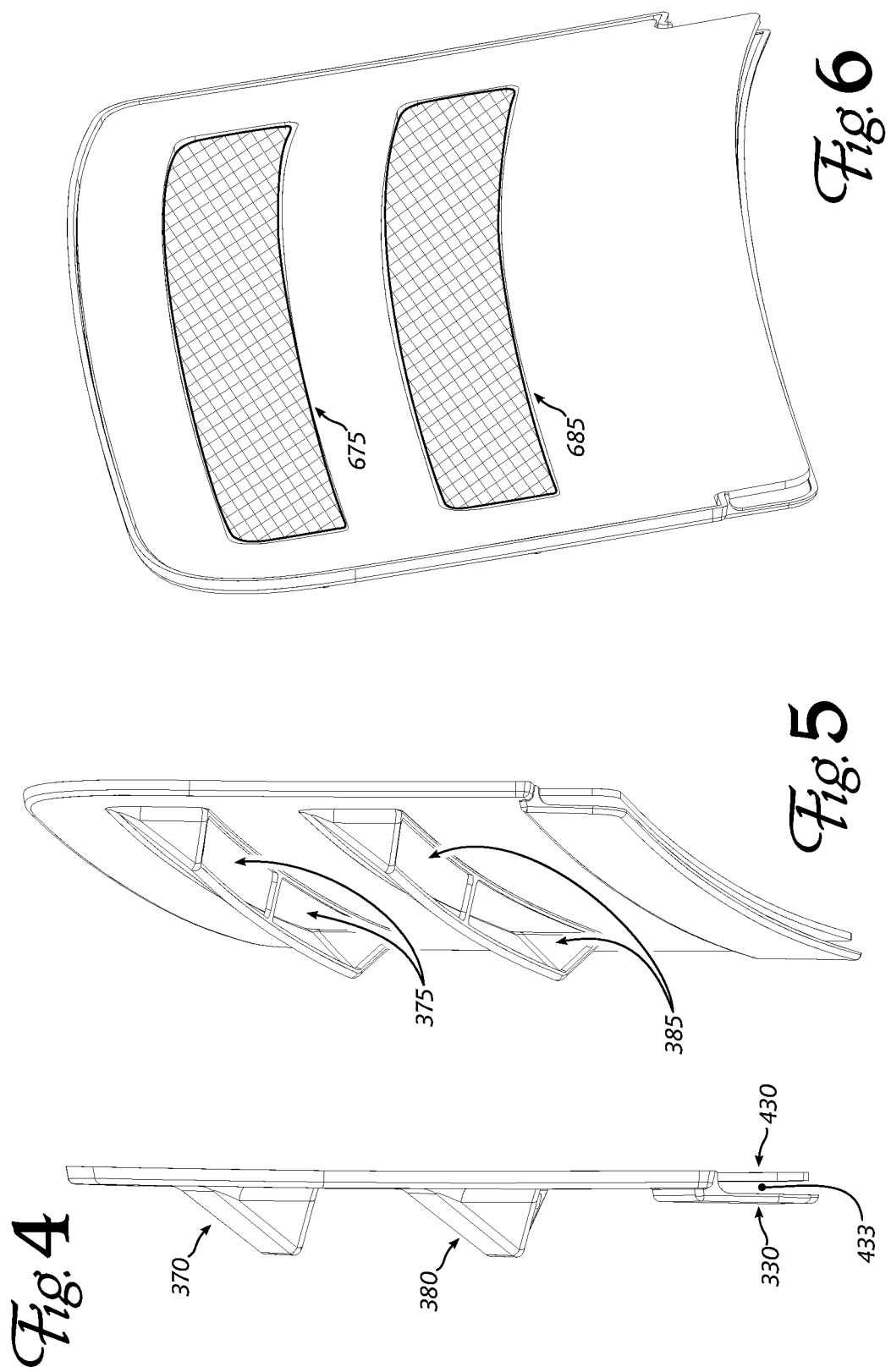

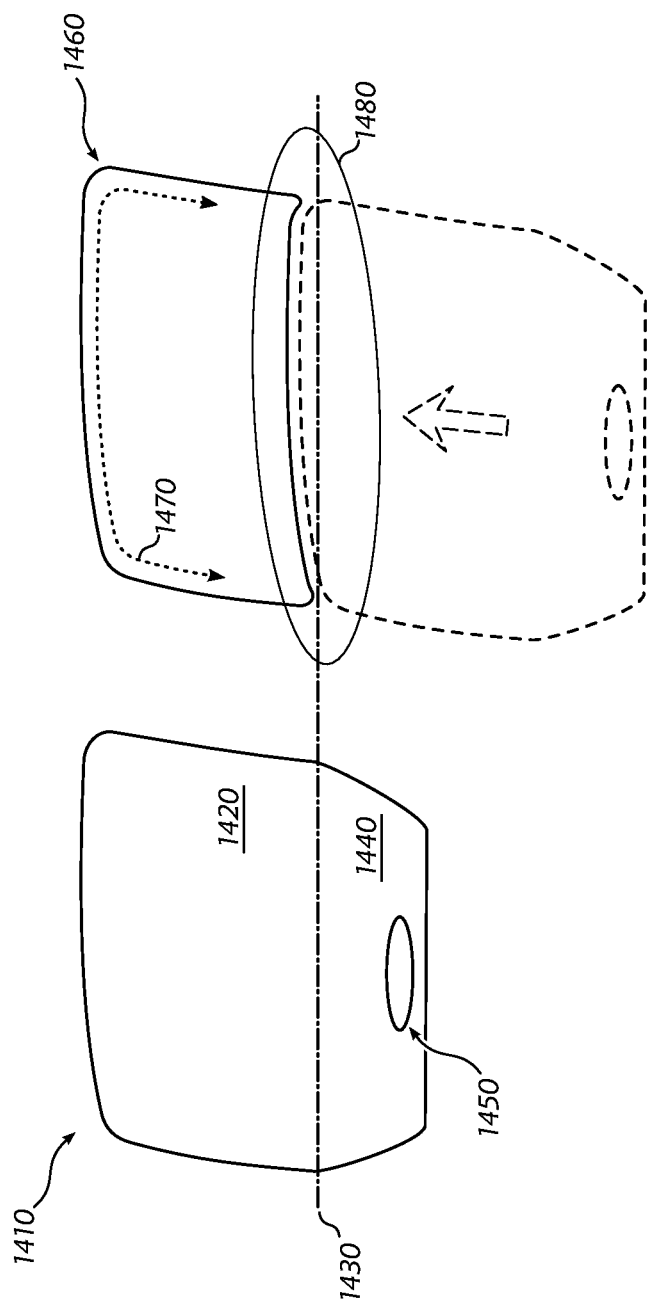

VEHICLE WINDOW VENT FOR PROTECTING PASSENGERS FROM EXCESS HEAT

FIELD

The invention relates to removable ventilation accessories for vehicles. More specifically, the invention relates to secure removeable window vents with features to improve comfort and safety for vehicle occupants.

BACKGROUND

Vehicle design and construction techniques have advanced far beyond the "horseless carriage" contraptions which were merely internal-combustion engines married to no-horse-necessary horse-drawn coaches. Vehicle shells are stronger and more aerodynamic. Windows are often larger to provide better visibility, yet they seal securely to separate the cabin environment from external conditions. Environmental control systems have advanced, too: now, cabin air is commonly recirculated, filtered and conditioned to achieve a comfortable temperature and humidity level.

Unfortunately, the comfortable environment can only be maintained while the vehicle is operating. When parked and turned off, the well-sealed interior becomes a liability, with cabin temperatures able to rise high above exterior ambient temperatures if the vehicle is in the sun. These temperatures are harmful or even deadly to animals and children who may be left in the vehicles while they are not running.

Some drivers opt to leave vehicle windows open to ameliorate high temperatures, but open windows invite vandals and thieves, and also admit rain and dust. An alternative approach may be of substantial value in this field. In addition, secure, weather-resistant ventilation structures may be helpful for individuals who spend substantial amounts of time in their vehicles while they are not in operation. For example, long-haul truck drivers and car/van campers may reside in their vehicles for days or weeks on end. Improved ventilation may make such stays more comfortable.

SUMMARY

An embodiment of the invention is a sturdy, mostly planar sheet having a shape substantially identical to an upper portion of a (glass) window of a vehicle. The sheet is configured to slide into the open channels in a vehicle door frame when the window is lowered, occupying substantially all of the area that would otherwise be occupied by the closed window glass. A lower portion of an embodiment comprises a channel to accept an upper edge of the window glass. Thus, when the embodiment is inserted into an open vehicle window and then the window glass is raised, the window glass forces the embodiment into the channels and keeps the embodiment from being removed.

An embodiment comprises vent holes or louvers, which may be angled to provide protection from precipitation. Ventilation (movement of air between the vehicle interior and exterior) occurs through the vent holes.

An embodiment may comprise a screen or mesh, arranged so that insects and small debris cannot easily enter the vehicle through the vent holes.

Some embodiments may comprise solar-powered ventilation fans or pass-through features to allow liquids or small solid objects to be passed into the vehicle through planar sheet. Other embodiments may include sensors, such as temperature sensors, to show the vehicle interior temperature.

BRIEF DESCRIPTION OF DRAWINGS

FIGS. 4-6 show additional views of the embodiment of FIG. 3.

FIG. 14 shows a representative vehicle window adjacent a representative embodiment.

DETAILED DESCRIPTION

Figure 2:
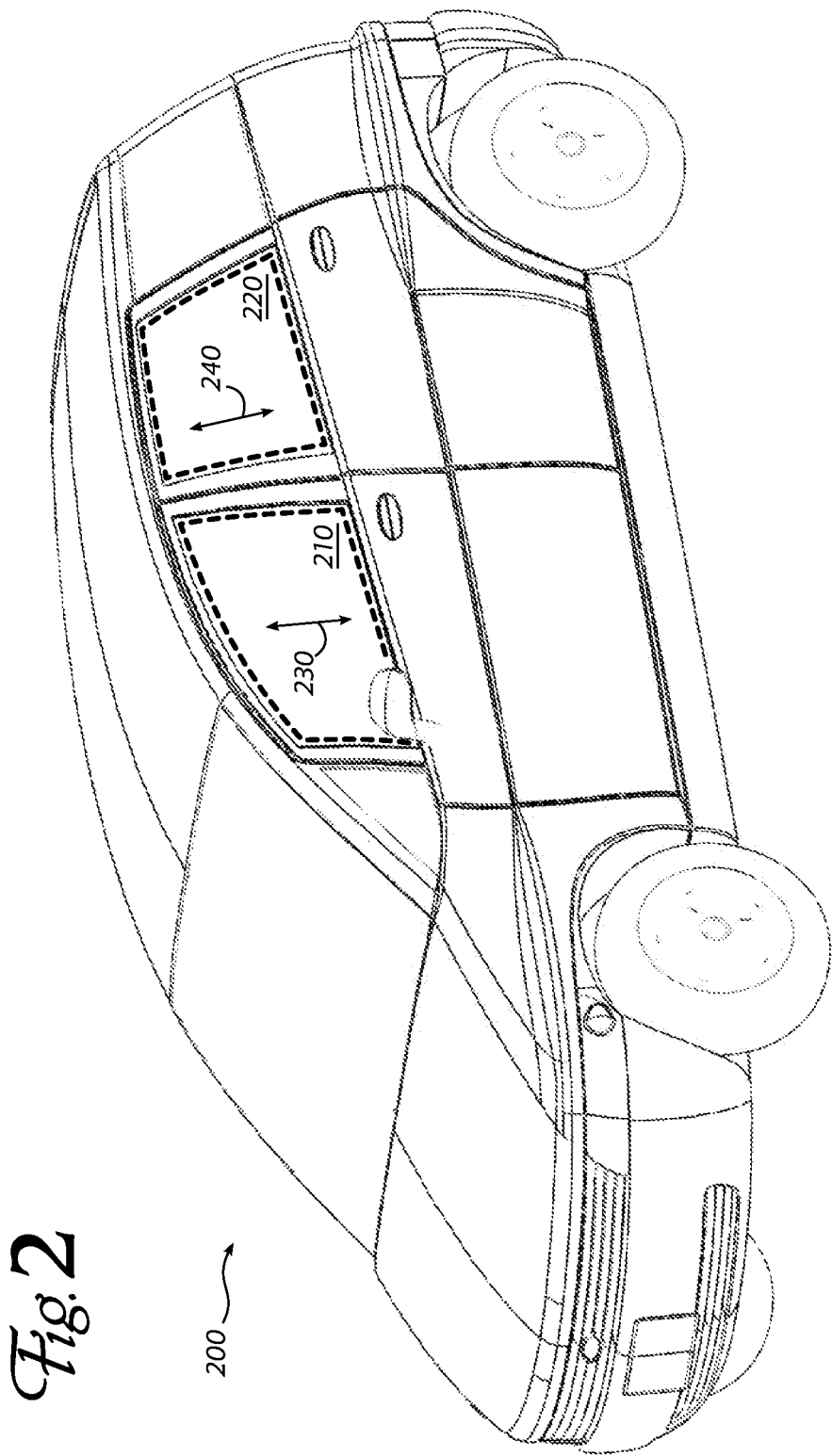
FIG. 2 shows a generic vehicle and points out features that interact with an embodiment.

FIG. 2 shows a typical four-door vehicle 200, with windows 210 and 220 in the left side doors. These windows may be raised and lowered by a manual or electric mechanism, as indicated by arrows 230 and 240. Lowering a window causes the glass to retract within the door (between the inner and outer surfaces thereof) and exposes the top edge of the window. When closed, the top edge (as well as the fore and aft edges) of a window are secured in a channel in the door structure that frames the window. When a window is partially opened, the upper part of the glass is still visible in the lower part of the window frame. If a window can be fully opened, the entire window glass will be lowered into the space between inner and outer door surfaces, below a "sill" across the bottom of the window opening at the top of the door.

Figure 1:
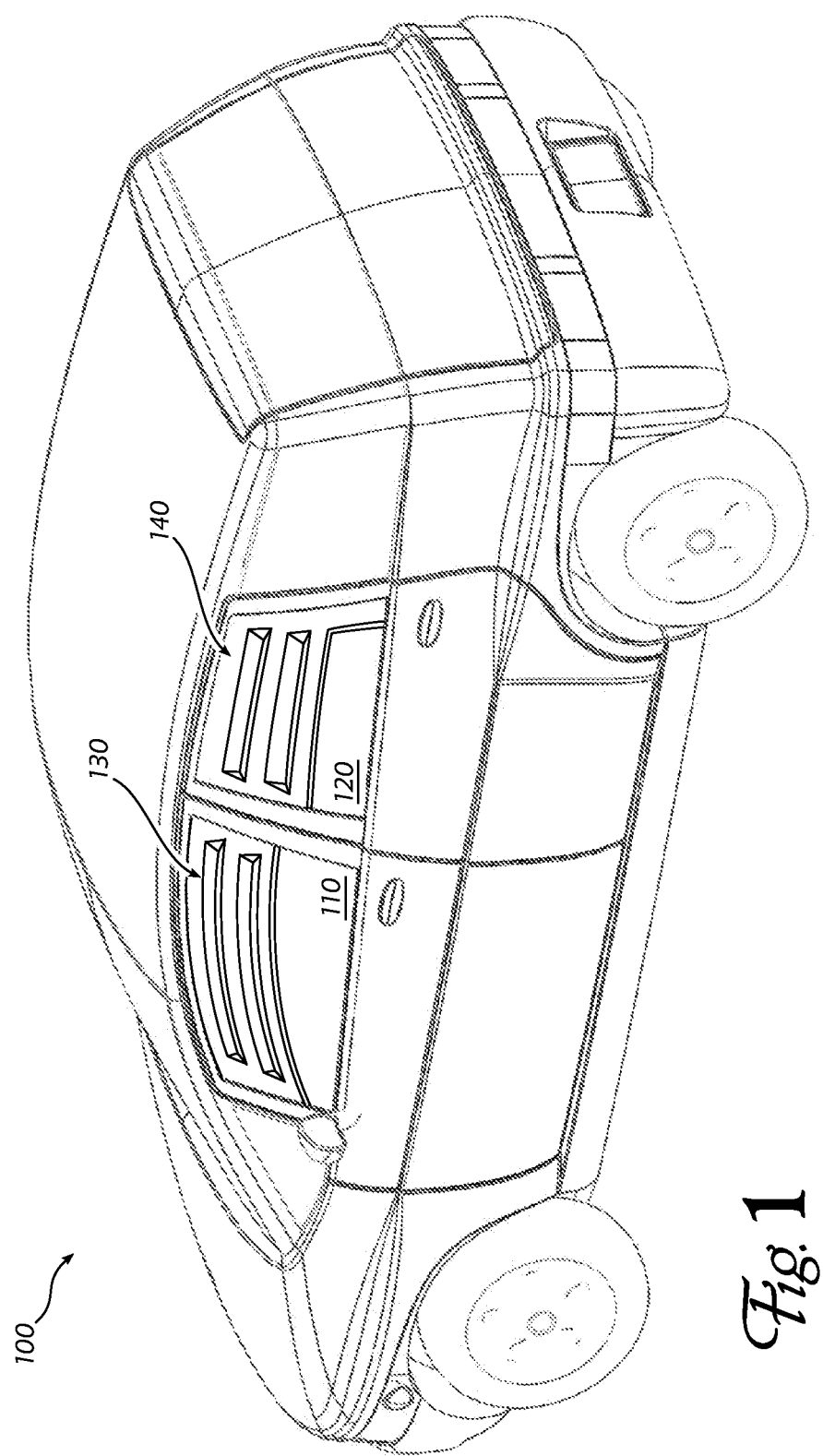
FIG. 1 shows a vehicle with two embodiments of the invention installed in side windows.

FIG. 1 shows a similar vehicle 100, where the front and rear side windows (110, 120) have been partially lowered, and vented window shades according to embodiments of the invention 130 and 140 have been secured into the open areas above the top edges of the windows. Each embodiment is shaped similarly to the top portion of the window, so that the embodiment fills the opening left by partially lowering the window glass. The upper, fore and aft edges of each embodiment are sized and shaped to fill the door frame channels that hold the corresponding edges of the window glass when the windows are fully raised. The lower edges of each embodiment comprise channels that are sized and shaped similarly to the upper door channels. The channels in the embodiments accept the top edge of the corresponding window, so that when the embodiment is inserted and the window raised to meet the embodiment's lower edge, the top edge of the window glass is secured to the bottom edge of the embodiment, and the window mechanism urges the glass and embodiment securely into the door frame channels, thus closing the area of the door's window frame that would otherwise be open.

Each embodiment of the invention (130, 140) comprises at least one louver or vent opening, as well as other features described below. These vent openings allow air to pass between the vehicle interior and exterior.

Figure 3:
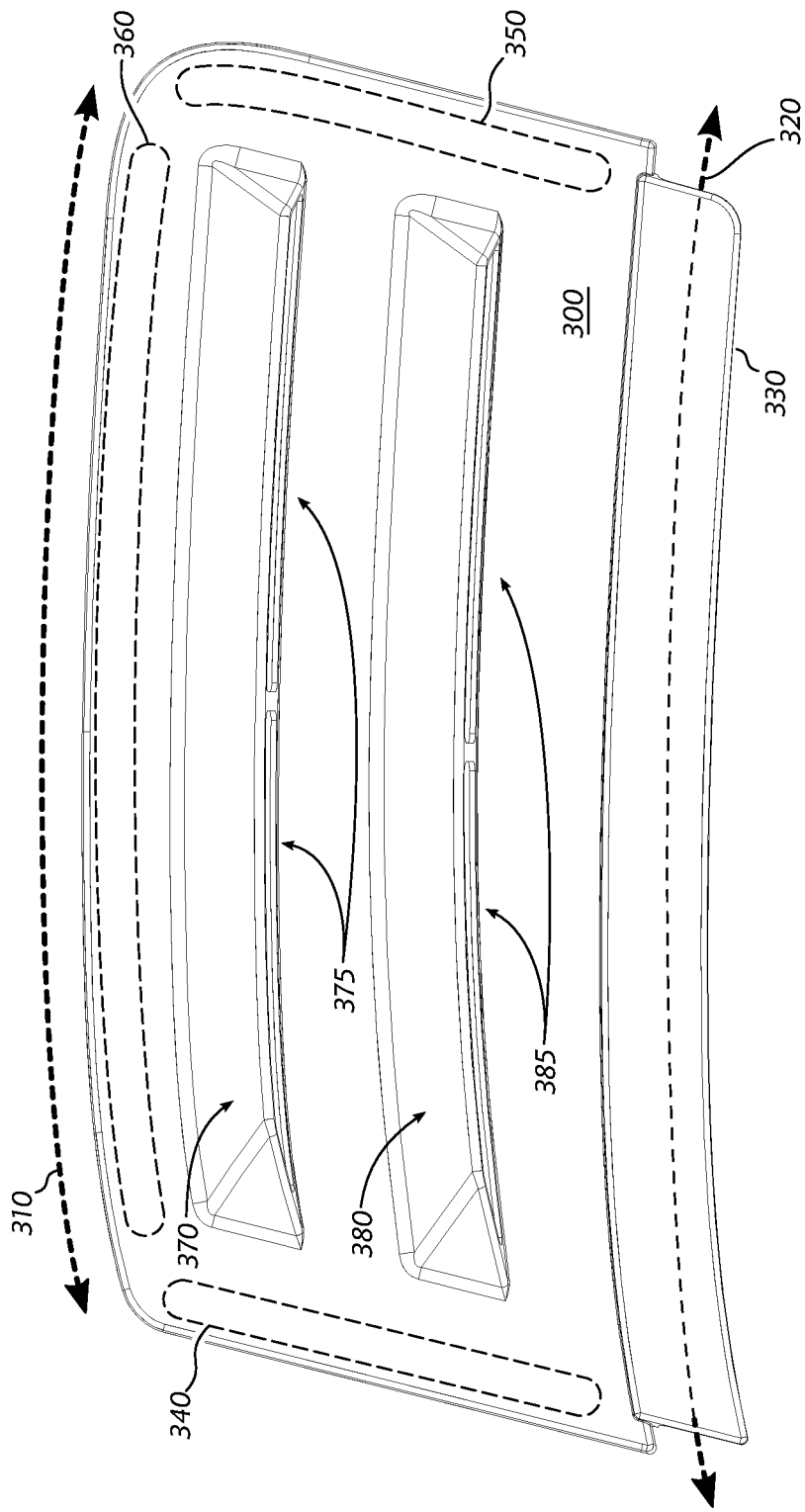
FIG. 3 is a plan view of an embodiment for a different vehicle.

FIG. 3 shows an exterior plan view of an embodiment of the invention. Embodiments are generally rectangular, but vehicle windows may be trapezoidal or parallelograms, and embodiments for those vehicles are shaped similarly. The upper edge of the embodiment has a curve 310 that matches the upper edge of the window of the corresponding vehicle. The upper edge of the window can be urged against the lower edge of the embodiment (note similar curve 320). A flap 330 at the bottom of the embodiment rests outside the window glass along the top edge.

The embodiment may be viewed as a substantially planar structure 300 (this may have a slight curvature, similar to the curvature of the vehicle's window glass). The peripheral outline is similar to the shape of the vehicle's window glass. The fore and aft side edges (340, 350) are generally parallel. These edges (340, 350) and the upper edge (360) rest in channels in the vehicle's door when the embodiment is installed. These same door channels normally accept the edges of the window glass when the window is fully closed.

Extending out from the exterior surface 300 are a plurality of louvers or vents, 370 & 380. The lower sides of the vents are open (375, 385) and allow air to pass between the vehicle interior and exterior. The embodiment is preferably made of an opaque material, to provide shade and privacy. The outer surface may be a light color or reflective to reduce solar heating of the vehicle interior. Opaque vents may also be helpful to reduce sunlight intrusion and glare even during driving, provided that the windows where they are installed may be occluded without compromising driving safety.

FIG. 4 shows an edge view of the same embodiment, looking from the aft edge 350 toward the forward edge 340. The triangular profiles of the louvers 370 and 380 are apparent in this view. In addition, the flap 330 that rests outside the window glass, and another flap 430 that rests inside the window glass, may be seen. The upper edge of the window glass is held between these flaps, in the gap at 433. The louvers are angled down, with the openings on the lower portion of the triangular shape. This "hooded" shape helps keep precipitation that strikes the embodiment from entering the vehicle through the openings.

FIG. 5 shows another view of the same embodiment. Here, the openings 375 and 385 at the lower ends of the louvers may be seen.

FIG. 6 shows the surface of the embodiment that faces the inside of the vehicle when the embodiment is installed. In this view, openings 675 and 685 are visible. These communicate with exterior openings 375 and 385 to allow air in and out of the vehicle. In a preferred embodiment, these openings are covered with a mesh to exclude insects and other objects.

Figure 7:
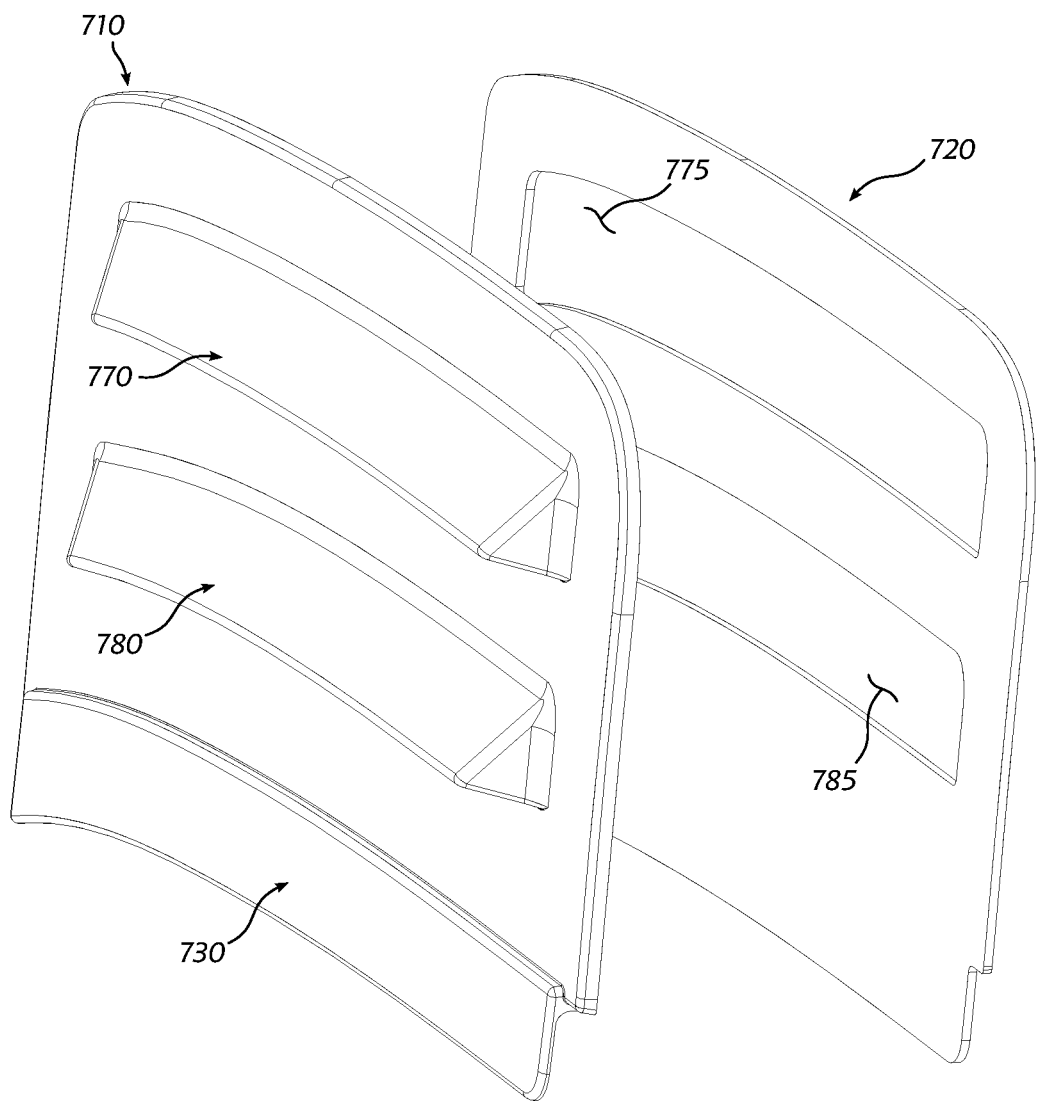
FIG. 7 is an exploded view of an embodiment.

FIG. 7 is an exploded view of an embodiment. An embodiment may efficiently be formed as a laminate of two principal layers: an exterior panel 710 comprising features similar to those described earlier: vent louvers 770 and 780, and a flap 730 to secure the external panel against the top edge of the window glass. The second principal layer of the laminate is an interior panel 720. This may be a simple, mostly planar panel with vent openings 775 & 785 formed therein. A mesh layer (not shown here) may be interposed between the laminate layers.

Figure 8:
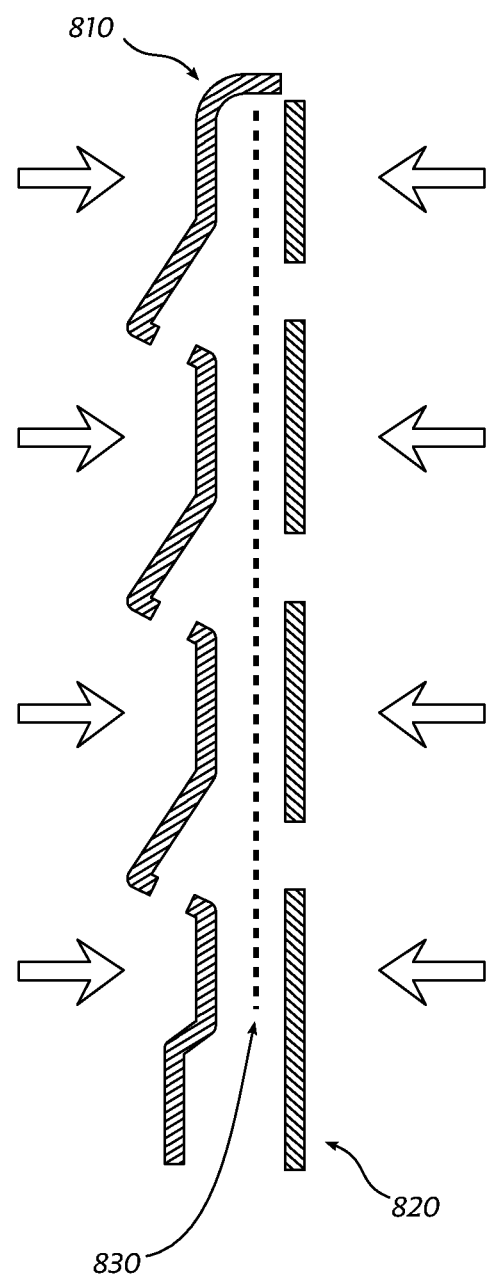
FIG. 8 is a cross section of an embodiment.

FIG. 8 is a cross-section of a laminate as described above. The exterior panel 810 may be constructed efficiently by vacuum forming of a plastic material. The interior panel 820 may be a simple die-cut sheet part (no forming is necessary; the intrinsic flexibility of the sheet material may permit the formation of a suitable curved surface resembling the curved window glass). A mesh 830 may be laminated between the exterior panel 810 and the interior panel 820.

Figure 9:
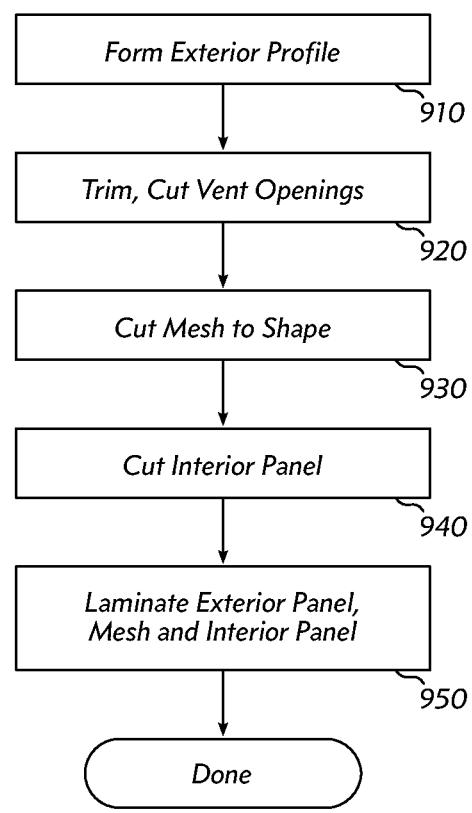
FIG. 9 is a flow chart for manufacturing an embodiment.

FIG. 9 outlines a manufacturing method to produce embodiments of the invention. First, a sheet material is heated and formed into the shape of the desired exterior profile, including louvers and other features (910). Vacuum forming is a preferred method of producing this part. When the part is removed from the mold, it is trimmed and vent openings are cut (920). A length of mesh material is cut to shape (930). The interior panel is cut (including the peripheral outline and openings corresponding to the exterior louvers (940). Finally, the separate parts (layers or "plies") are laminated into a finished product using heat, adhesive, ultrasonic welding, or another suitable technique (950). In some embodiments, the "lamination" may be reversible: the layers may be joined by screws, fasteners, snaps or other structures. In such an embodiment, the layers may be disassembled, for example to replace a damaged mesh layer. Different embodiments may be provided with finer or coarser meshes, according to the sorts of insects it is desired to exclude.

Figure 10:
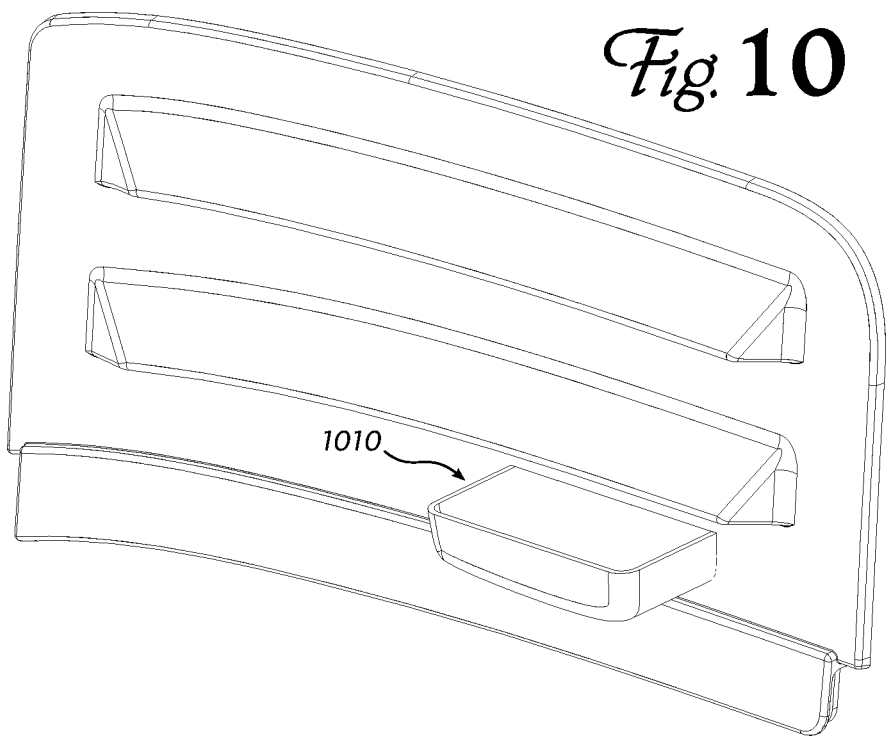
FIG. 10 illustrates a feature that may be provided in some embodiments.

FIG. 10 shows an embodiment comprising a passthrough opening having a dish shape 1010. This feature allows water to be poured into the exterior portion of the dish, and be reached by an animal present in the interior of the vehicle. Providing this feature permits passers-by to give water to animals that may be experiencing thermal distress within the vehicle. Without such a feature, passers-by might be obliged to call emergency services or break a window to assist an animal inside.

Figure 11:
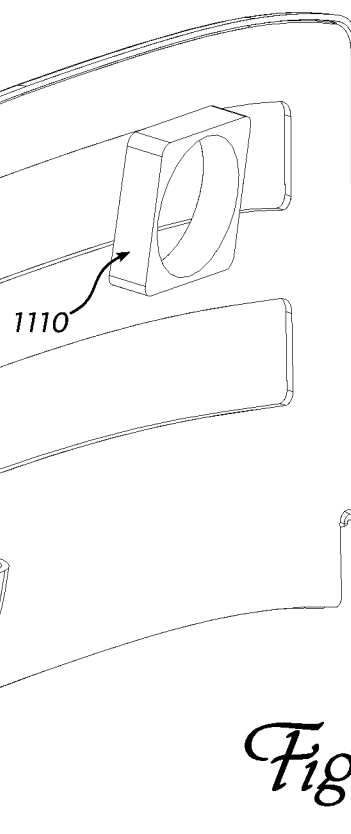
FIG. 11 illustrates a feature that may be provided in some embodiments.

FIG. 11 shows an embodiment comprising a solar powered fan 1110 to improve air circulation. Solar cells to provide energy for the fan may be disposed on an exterior surface of the embodiment. Paired embodiments may operate the fans in opposite directions, so that fresh air is urged into the vehicle through an embodiment on one side, while stale, heated air is extracted through an embodiment on the other side of the vehicle. An embodiment comprising a fan may be viewed as an active ventilation device or system. To allow passers-by to understand its function and capability, an externally-visible thermometer may be provided on a vent to indicate the temperature inside the vehicle.

Figure 12:
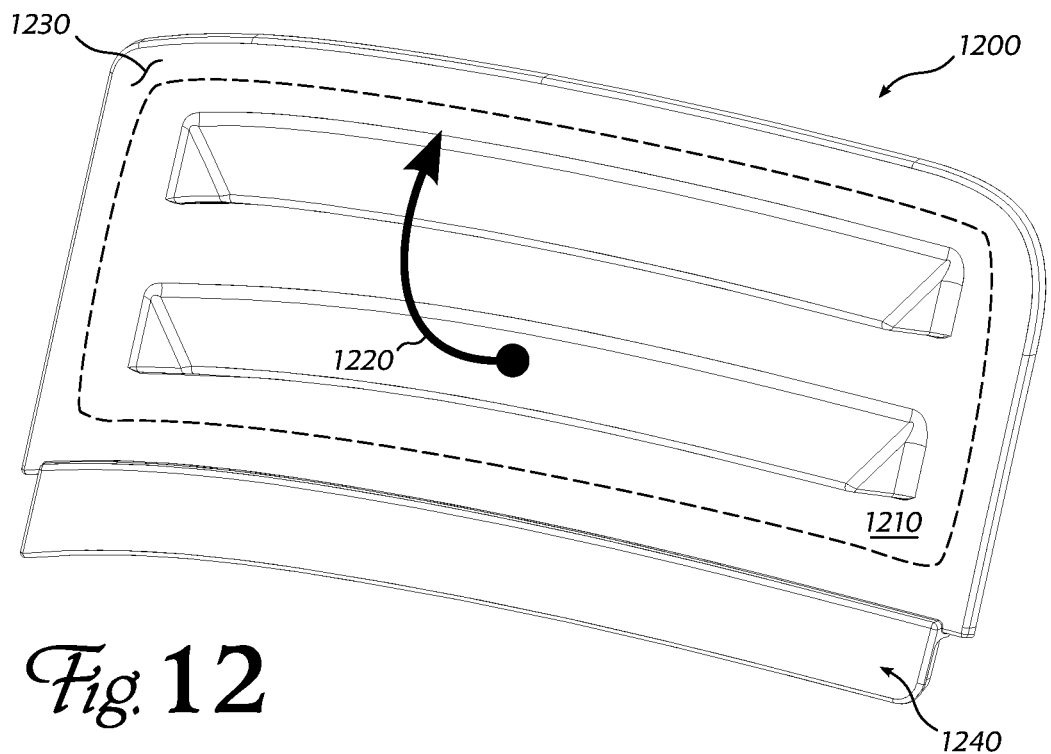
FIG. 12 illustrates a feature that may be provided in some embodiments.

FIG. 12 shows an embodiment 1200 where the louvered panel 1210 is constructed so that it can flip up along a hinge line, as indicated by arrow 1220. In this embodiment, the peripheral edges of the panel (e.g. at 1230) are still captured by the door channels for the window glass, and the bottom edge of the embodiment 1240 mates with the top edge of the window glass to secure the embodiment in the window frame. The flip-up panel 1210 can be opened to allow larger objects to pass through without removing the vented panel from the window opening. The flip-up panel may comprise a mechanical latch to prevent its being opened from the exterior of the vehicle.

Figure 13:
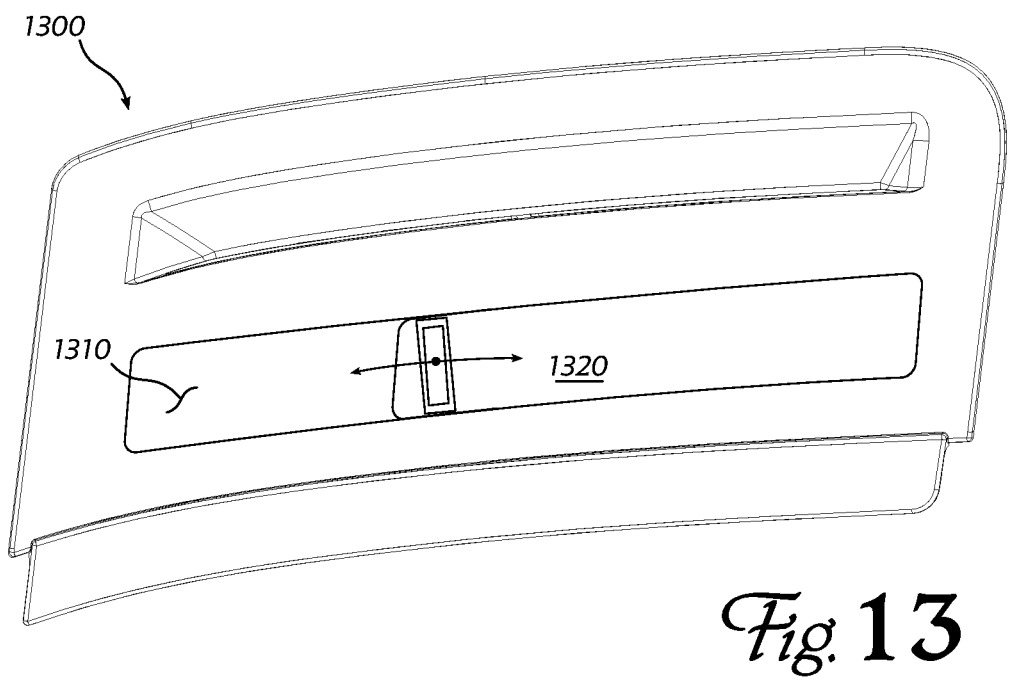
FIG. 13 illustrates a sliding window opening that may be provided in some embodiments.

FIG. 13 shows another embodiment 1300 where one vent louver has been replaced with a simple opening 1310 having a sliding door 1320. The simple opening, like the flip-up panel in FIG. 12, can allow larger objects to pass through the vented panel.

FIG. 14 shows a representative vehicle window 1410 (i.e., the shape of the piece of glass that forms the window). The upper part 1420 (above the door windowsill at about 1430) fits in a channel formed around the door frame. The lower portion of the window 1440, including an opening, connection feature or similar structure at 1450 to interface with a window opening and closing mechanism, is concealed within the door.

An embodiment of the invention, 1460, is shaped almost identically to the upper portion 1420 of the window glass 1410. In particular, the upper, fore and aft edges, shown along dashed line 1470, are the same shape and thickness as the corresponding portion of the window. The lower edge of embodiment 1460 has a shape complementary to the upper edge of the window glass (see at 1480), so that the upper edge of the window glass can push the embodiment of the invention securely into the door channels when the window glass is raised from its lowest position. As discussed above, a channel or flap along the lower edge of the embodiment accepts the upper edge of the window glass, and raising the window glass pushes the inventive ventilation panel into the door channels. When so arranged, the ventilation panel cannot be removed from its position without substantially deforming the panel or damaging the vehicle—it is "locked" in place.

In a particular implementation, a removable window vent for a vehicle comprises a generally rectangular, planar sheet having two roughly parallel vertical edges and a roughly horizontal upper edge, said roughly horizontal upper edge having a convex curvature; a roughly horizontal lower edge having a concave curvature similar to the convex curvature; a channel formed in the roughly horizontal lower edge, said channel to accept an upper edge of a window of the vehicle; two generally parallel horizontal louvers having triangular profiles formed on an outer surface of the generally rectangular planar sheet, said two generally parallel horizontal louvers extending substantially all of a width of the generally rectangular planar sheet, a lower surface of each of the two generally parallel horizontal louvers having openings therein; two generally parallel rectangular openings formed on an inner surface of the generally rectangular planar sheet, said two generally parallel rectangular openings aligned to permit air to flow therethrough and through the openings in the lower surface of each of the two generally parallel horizontal louvers; and mesh to cover each of the two generally parallel rectangular openings formed on the inner surface of the generally rectangular planar sheet.

The applications of the present invention have been described largely by reference to specific examples and in terms of particular arrangements of features. However, those of skill in the art will recognize that vehicle ventilation panels can also be produced by software and hardware that distribute the functions of embodiments of this invention differently than herein described. Such variations and implementations are understood to be captured according to the following claims.

I claim:

1. A removable vent for a vehicle window opening, comprising:
   a substantially planar structure having a first peripheral edge region that is so shaped and dimensioned as to be slidably receivable within one or more channels that accept a peripheral edge region of a vehicle window when the vehicle window is closed;
   a second peripheral edge region defining a channel so sized and dimensioned as to accept a corresponding portion of the peripheral edge region of the vehicle window;
   wherein the substantially planar structure defines an opening through which air may pass between an interior of the vehicle and an exterior of the vehicle when the substantially planar structure is positioned within the vehicle window opening such that the first peripheral edge region is slidably received within the one or more channels and the channel of the second peripheral edge accepts the corresponding portion of the peripheral edge region of the vehicle window, the substantially planar structure comprising a laminated body having a first principal layer and a corresponding second principal layer, wherein the first principal layer is an exterior panel defining an aperture corresponding to the opening through which air may pass, wherein the second principal layer is an interior panel defining the opening through which air may pass, the substantially planar structure further comprising a mesh screen positioned between the first principal layer and the second principal layer, wherein the first principal layer and the second principal layer are immovably connected with each other.

2. The removable vent of claim 1, wherein the screen covers the opening so that air may pass through the opening while preventing insects from passing through the opening.

3. The removable vent of claim 1 wherein the opening is a first opening, wherein the substantially planar structure defines at least a second opening.

4. The removable vent of claim 1 wherein the substantially planar structure is opaque.

5. The removable vent of claim 1 wherein the exterior panel defines an exterior surface having a light color.

6. The removable vent of claim 1 wherein the exterior panel defines a reflective exterior surface.

7. The removable vent of claim 1, further comprising:
   a dish-shaped passthrough formed through the substantially planar structure so that a liquid may be poured into an exterior portion of the dish-shaped passthrough, said liquid being thereafter accessible at an interior portion of the dish-shaped passthrough.

8. The removable vent of claim 1, further comprising:
   a solar cell disposed on an exterior surface of the substantially planar structure; and
   an electric fan disposed on an interior surface of the substantially planar structure, said solar cell to provide power to operate the electric fan.

9. The removable vent of claim 1, further comprising:
   a thermometer configured to sense a temperature within the vehicle and to display the temperature on an exterior surface of the substantially planar structure.

10. The removable vent of claim 1, wherein the exterior panel comprises a vacuum-formed panel further defining flap along the second peripheral edge, the channel being defined by a gap between the flap and the interior panel.

11. The removable vent of claim 10, wherein the exterior panel and the interior panel are ultrasonically welded together with the mesh screen therebetween, thereby immovably connecting the exterior panel and the interior panel with each other.

12. A vented window shade for a vehicle, comprising:
   an opaque panel having a shape of a portion of a window glass for a vehicle and a thickness of the window glass around a portion of a perimeter of the opaque panel so as to be removably insertable within a portion of a channel defined by a vehicle door that otherwise is configured to receive the window glass;
   the opaque panel having an edge-channel complementary in shape to an edge of the window glass, said edge-channel configured to receive the edge of the window glass, wherein
   if the vehicle window is opened, the opaque panel can be inserted into a space vacated by the window glass, and after the opaque panel is inserted into the space vacated by the window glass, the window glass can be positioned within the edge-channel to secure the opaque panel in the space vacated by the window glass, the opaque panel further comprising:

a thermo-formed exterior panel having a major surface and defining at least one louvered vent that opens through the thermo-formed exterior panel, the louvered vent defining an aperture through the major surface;

a mesh screen adhered to the major surface of the thermo-formed exterior panel, the mesh-screen extending across the aperture;

an interior panel so bonded with the thermo-formed exterior panel opposite the major surface thereof relative to the mesh screen as to be immovably affixed with the thermo-formed exterior panel, wherein the edge channel is defined by a gap between a portion of the thermo-formed exterior panel and the interior panel.

13. The vented window shade of claim 12, further comprising:

a dish-shaped passthrough penetrating the opaque panel so that liquid placed in the dish-shaped passthrough on one side of the opaque panel can be accessed in the dish-shaped passthrough on another, different side of the opaque panel.

14. The removable vent according to claim 1, wherein the exterior panel defines a louver adjacent the opening through which air may pass to reduce a propensity of precipitation to enter the vehicle after striking the substantially planar structure.

15. The removable vent according to claim 1, wherein the exterior panel and the interior panel are immovably joined with each other with the mesh screen sandwiched therebetween by a combination of heat and adhesive.

16. The vented window shade of claim 12, wherein the thermo-formed panel is formed by a vacuum forming process.

\* \* \* \* \*